United States Patent
Cao et al.

(10) Patent No.: US 11,284,127 B2
(45) Date of Patent: Mar. 22, 2022

(54) METHOD AND APPARATUS FOR PUSHING INFORMATION IN LIVE BROADCAST ROOM

(71) Applicant: BEIJING DAJIA INTERNET INFORMATION TECHNOLOGY CO., LTD., Beijing (CN)

(72) Inventors: Yang Cao, Beijing (CN); Yanfeng Wang, Beijing (CN); Jianbin Qi, Beijing (CN); Dongxia Zhu, Beijing (CN); Linghua Zhu, Beijing (CN)

(73) Assignee: Beijing Dajia Internet Information Technology Co., LTD., Beijing (CN)

( * ) Notice: Subject to any disclaimer, the term of this patent is extended or adjusted under 35 U.S.C. 154(b) by 0 days.

(21) Appl. No.: 17/386,642

(22) Filed: Jul. 28, 2021

(65) Prior Publication Data
US 2022/0060760 A1     Feb. 24, 2022

(30) Foreign Application Priority Data
Aug. 18, 2020   (CN) .......................... 202010833380.2

(51) Int. Cl.
*H04N 21/2187*     (2011.01)
*H04N 21/4788*     (2011.01)
(Continued)

(52) U.S. Cl.
CPC ..... *H04N 21/2187* (2013.01); *H04N 21/4828* (2013.01); *H04N 21/4312* (2013.01); *H04N 21/4788* (2013.01)

(58) Field of Classification Search
None
See application file for complete search history.

(56) References Cited

U.S. PATENT DOCUMENTS

| 6,205,478 B1 * | 3/2001 | Sugano | G06Q 30/06 709/223 |
| 10,684,738 B1 * | 6/2020 | Sicora | G06F 16/435 |

(Continued)

FOREIGN PATENT DOCUMENTS

| CN | 108769775 A | 11/2018 |
| CN | 110287399 A | 9/2019 |

(Continued)

OTHER PUBLICATIONS

National Intellectual Property Administrations (NIPA), Office Action for CN application 202010833380.2 with English translation.

(Continued)

*Primary Examiner* — William J Kim
(74) *Attorney, Agent, or Firm* — Timothy W. Menasco, Esq.; Harter Secrest & Emery LLP (57) ABSTRACT

A method and an apparatus for pushing information in a live broadcast room is provided. After a first client sends a keyword to a server, the server returns a name of a target object obtained based on the keyword and a live broadcast room access path to the first client, and in response to an access request of the first client, accesses the first client to a corresponding live broadcast room, and pushes access description information of the first client and the name of the target object to other clients that have accessed the live broadcast room. After other clients have accessed the live broadcast room, whenever a new client accesses the live broadcast room, the name of the target object associated when the new client accesses the live broadcast room is displayed.

20 Claims, 9 Drawing Sheets

(51) Int. Cl.
*H04N 21/482* (2011.01)
*H04N 21/431* (2011.01)

(56) References Cited

U.S. PATENT DOCUMENTS

| | | | |
|---|---|---|---|
| 2003/0007464 A1* | 1/2003 | Balani | H04W 4/021 |
| | | | 370/310 |
| 2007/0005754 A1* | 1/2007 | Horvitz | H04L 67/22 |
| | | | 709/224 |
| 2010/0228777 A1* | 9/2010 | Imig | G06F 16/335 |
| | | | 707/772 |
| 2013/0073608 A1 | 3/2013 | Hu et al. | |
| 2016/0142414 A1* | 5/2016 | Zou | H04L 63/10 |
| | | | 726/4 |
| 2018/0089593 A1* | 3/2018 | Patel | G06N 5/003 |
| 2018/0167226 A1* | 6/2018 | Loennqvist | H04L 12/1813 |
| 2019/0110105 A1* | 4/2019 | Chen | H04N 21/4788 |
| 2020/0322658 A1* | 10/2020 | Shah | H04N 21/8358 |

FOREIGN PATENT DOCUMENTS

| | | | |
|---|---|---|---|
| CN | 110324696 A | | 10/2019 |
| CN | 111031334 A | | 4/2020 |
| CN | 111277852 A | | 6/2020 |
| CN | 111405302 A | | 7/2020 |
| JP | 2007047887 A | * | 2/2007 |
| KR | 101474835 B1 | * | 12/2014 |
| WO | 2020063101 A1 | | 4/2020 |

OTHER PUBLICATIONS

Green Bean Software Park, How to set the prompt for people who come in in the Kuaishou live broadcast room with English translation, Oct. 30, 2019.

European Patent Office, Search Report for EP application 21188053.9, dated Jan. 14, 2022.

* cited by examiner

METHOD AND APPARATUS FOR PUSHING
INFORMATION IN LIVE BROADCAST
ROOM

CROSS-REFERENCE TO RELATED APPLICATIONS

This application claims priority to and benefits of Chinese Patent Application Serial No. 202010833380.2, filed on Aug. 18, 2020, the entire content of which is incorporated herein by reference for all purposes.

TECHNICAL FIELD

The disclosure relates to multimedia technologies, and specifically relates to a method for pushing information in a live broadcast room and an apparatus for pushing information in a live broadcast room.

BACKGROUND

With increasing maturity of live broadcast technologies, more and more audience are accustomed to watching live videos in a live broadcast room to obtain the latest information.

SUMMARY

In a first aspect, a method for pushing information in a live broadcast room is provided. The method is applied to an anchor client or an audience client that has accessed the live broadcast room. The method includes: receiving access description information of a first client pushed by a server, in response to the first client accessing the live broadcast room through an access path of a target object, in which the access description information includes a name of the target object obtained by the first client from the server based on a keyword; and displaying the access description information on an interface of the live broadcast room.

In a second aspect, a method for pushing information in a live broadcast room is provided. The method is applied to a first client that has not accessed the live broadcast room, and includes: sending a keyword to a server; receiving a name of a target object and a live broadcast room access path associated with the target object from the server, in which the name of the target object is obtained by the server based on the keyword; and sending an access request to the server in response to an access instruction generated based on the live broadcast room access path, in which the access request is configured to access a live broadcast room through the server and to cause the server to push access description information of the first client to clients accessed to the live broadcast room other than the first client, in which the access description information includes the name of the target object.

In a third aspect, a method for pushing information in a live broadcast room is provided. The method is applied to a server and includes: receiving a keyword sent by a first client; returning a name of a target object obtained based on the keyword and an access path of the live broadcast room associated with the target object, to the first client; accessing the first client to a corresponding live broadcast room in response to an access request sent by the first client based on the live broadcast room access path; and pushing access description information of the first client to clients accessed to the live broadcast room other than the first client, in which the access description information includes the name of the target object.

In a fourth aspect, an electronic device is provided. The electronic device includes: a memory, configured to store executable instructions; and a processor, configured to read and execute the executable instructions stored in the memory to implement any method as described in the first aspect.

In a fifth aspect, an electronic device is provided. The electronic device includes: a memory, configured to store executable instructions; and a processor, configured to read and execute the executable instructions stored in the memory to implement any method as described in the second aspect.

In a sixth aspect, a network device is provided. The network device includes: a memory, configured to store executable instructions; and a processor, configured to read and execute the executable instructions stored in the memory to implement any method as described in the third aspect.

In a seventh aspect, a non-transitory computer-readable storage medium is provided. When instructions in the computer-readable storage medium are executed by a processor, any method according to any aspect of the embodiments of the disclosure is implemented.

DETAILED DESCRIPTION

In order to improve the service performance of the system, in embodiments of the disclosure, after each client accesses the live broadcast room, whenever a new client accesses the live broadcast room based on a search keyword, the server pushes a name of a target object associated with the keyword to each access client in the live broadcast room.

Embodiments of the disclosure are described in detail below with reference to the accompanying drawings.

Figure 1:
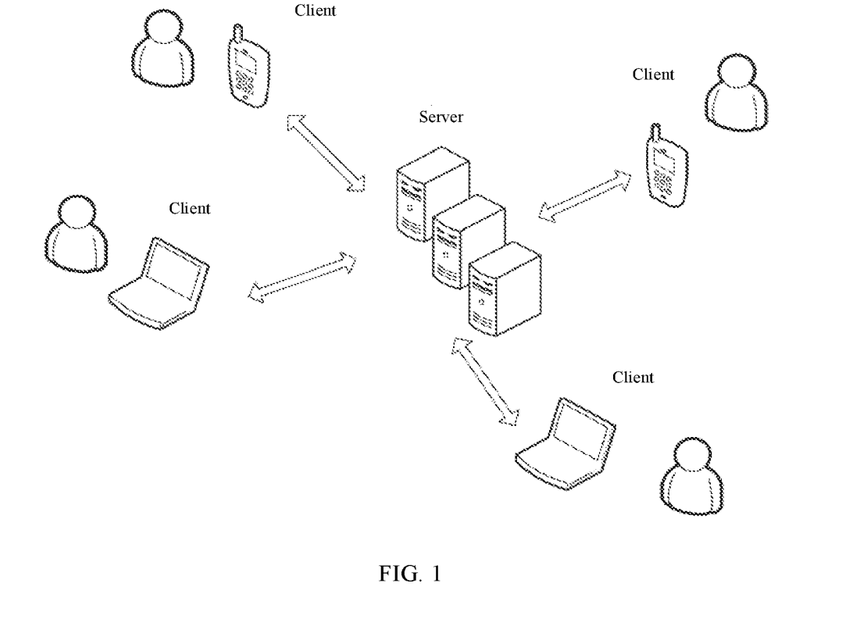
FIG. 1 is a schematic diagram of an architecture of a multimedia service system according to embodiments of the disclosure.

As illustrated FIG. 1, in embodiments of the disclosure, each client logs in on the server and uses various services provided by the server, such as querying a target object through the server, accessing a live broadcast room through the server, watching live videos, accessing a presentation page of the target object through the server and watching introduction details. The server may be a single server or a server cluster, which may be flexibly set according to the application environment, which is not elaborated here.

In related art, after respective audience clients access the live broadcast room, the audience client could only interact with an anchor client, and different audience clients could not communicate with each other.

In this way, it is difficult for the audience client to obtain necessary information from other audience clients, and without sufficient information, it is difficult for the system to effectively guide behavior of respective audience clients, thereby reducing service performance of the system.

Figure 2A:
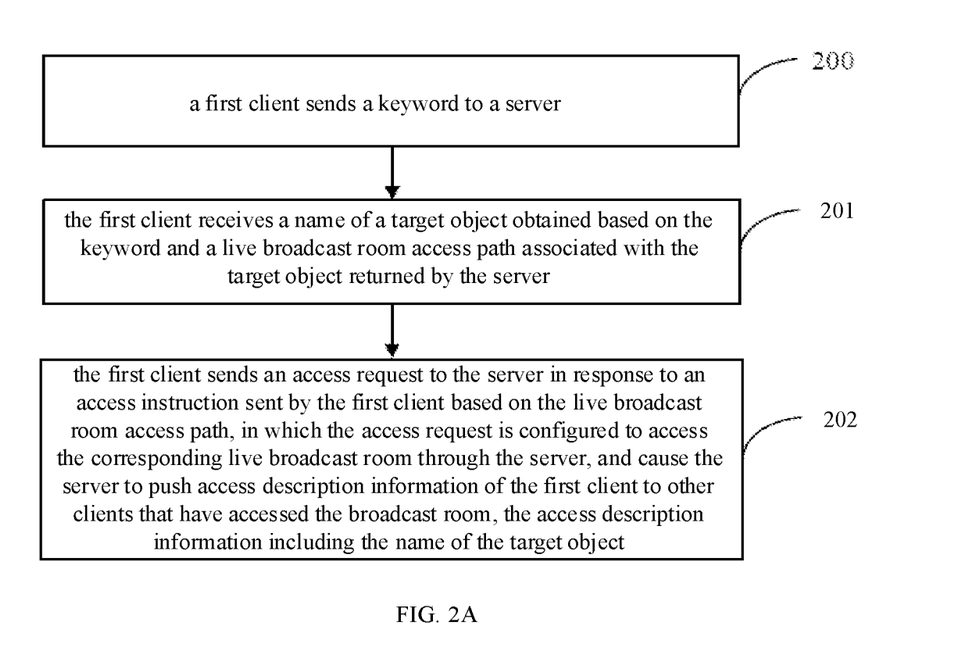
FIGS. 2A, 2B, and 2C are three flowcharts of pushing information in a live broadcast room according to embodiments of the disclosure.

Based on the above system architecture, as illustrated in FIG. 2A, in embodiments of the disclosure, the first client accesses the live broadcast room by querying the keyword and triggers the server to push information. The overview process is provided as follows.

At step 200, a keyword is sent by a first client to a server.

In a specific implementation, after receiving the keyword input by the user, the first client sends a query request carrying the keyword to the server.

At step 201, the first client receives a name of a target object and a live broadcast room access path associated with the target object returned by the server, in which the name of the target object is obtained based on the keyword.

In a specific implementation, the first client receives a query result returned by the server. The query result carries the name of the target object obtained based on the keyword and the live broadcast room access path associated with the target object.

At step 202, the first client sends an access request to the server in response to an access instruction sent by the first client based on the live broadcast room access path. The access request is configured to access the corresponding live broadcast room through the server, and cause the server to push access description information of the first client to other clients that have accessed the live broadcast room. The access description information includes the name of the target object.

In a specific implementation, the first client presents the name of the target object and the live broadcast room access path associated with the target object to the user, and when the user clicks on the live broadcast room access path, the first client sends the access request to the server, and accesses the corresponding live broadcast room through the server. Correspondingly, after the first client accesses the live broadcast room, the server pushes the access description information of the first client to other clients that have accessed the live broadcast room, in which the access description information includes the name of the target object.

Figure 2B:
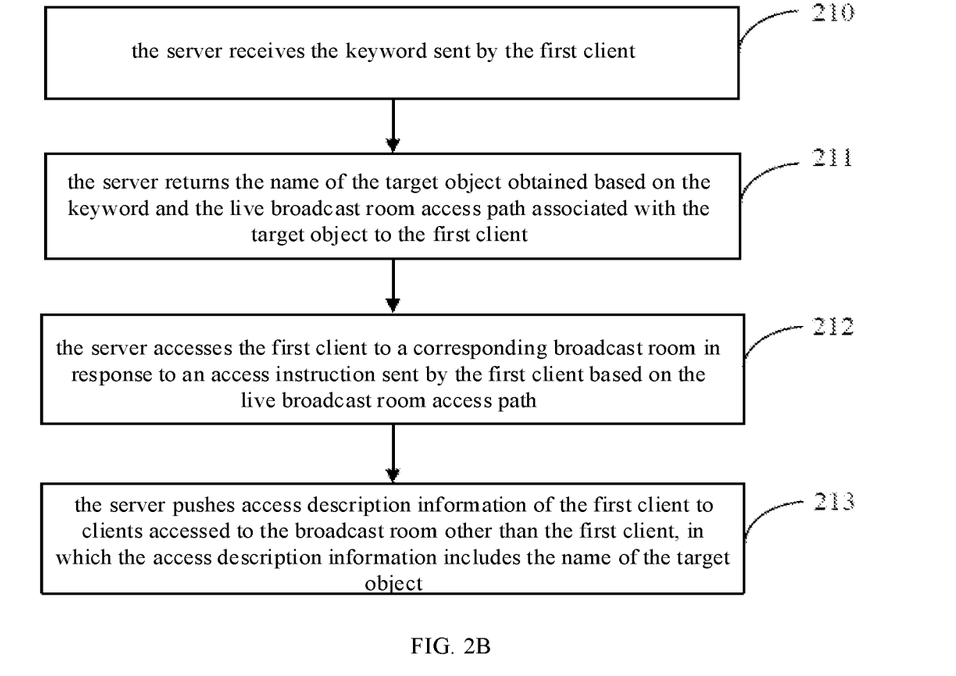

Correspondingly, as illustrated in FIG. 2B, in embodiments of the disclosure, after accessing the first client to the live broadcast room, the server pushes information in the live broadcast room, the overview process of which is as follows.

At step 210, the server receives the keyword sent by the first client.

At step 211, the server returns the name of the target object obtained based on the keyword and the live broadcast room access path associated with the target object to the first client.

In a specific implementation, after step 210 is executed, and before step 211 is executed, further, the server may further perform following operations of:

obtaining the name of the target object corresponding to the keyword by analyzing the keyword;

obtaining a display state of the target object through a real-time feature interface of target object provided in a background; and obtaining the live broadcast room access path associated with the target object if the display state is live broadcasting.

At step 212, the server accesses the first client to a corresponding live broadcast room in response to an access instruction sent by the first client based on the live broadcast room access path.

At step 213, the server pushes access description information of the first client to clients accessed to the live broadcast room other than the first client, in which the access description information includes the name of the target object.

In a specific implementation, when step 213 is executed, the server pushes the access description information of the first client to clients accessed to the live broadcast room other than the first client when a time period between a current time and a time corresponding to a last pushing reaches a preset threshold.

Further, after step 213 is executed, the server pushes a details page of the target object to the clients other than the first client, in response to an operation instruction generated by the clients other than the first client based on the name of the target object.

Figure 2C:
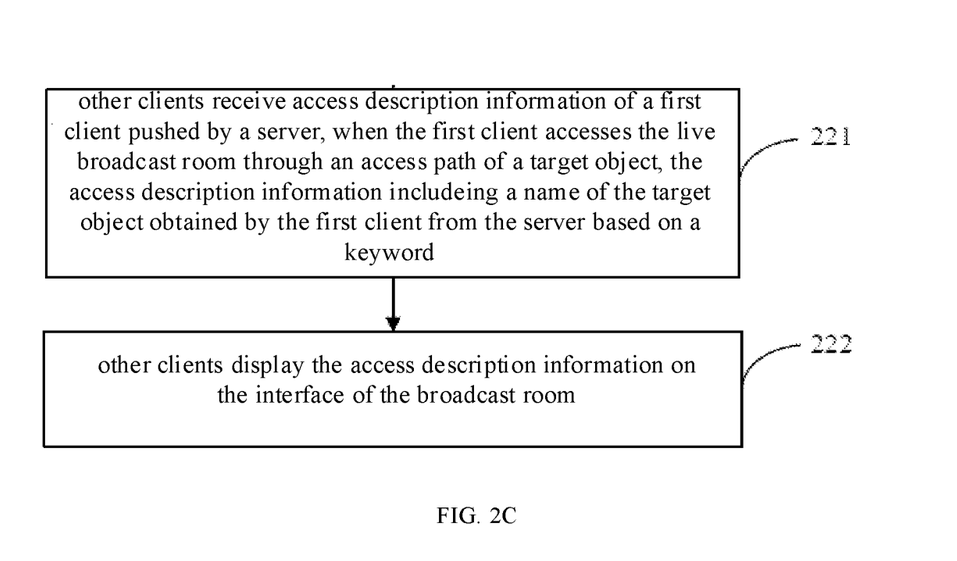

Correspondingly, as illustrated in FIG. 2C, in embodiments of the disclosure, after other clients access the live broadcast room, the information pushed by the server based on the keyword queried by the first client is received, the overview process of which is as follows.

At step 221, other clients receive access description information of a first client pushed by a server, when the first client accesses the live broadcast room through an access path of a target object. The access description information includes a name of the target object obtained by the first client from the server based on a keyword.

At step 222, other clients display the access description information on the interface of the live broadcast room.

In a specific implementation, when a time period between the current time and the time corresponding to the last pushing reaches a preset threshold, the other clients present the access description information on the interface of the live broadcast room.

In a specific implementation, the other clients display the access description information in a form of barrage or scrolling captain on the interface of the live broadcast room.

Further, after the access description information is displayed, the other clients access the details page of the target object from the live broadcast room in response to the operation instruction generated based on the name of the target object.

Figure 2D:
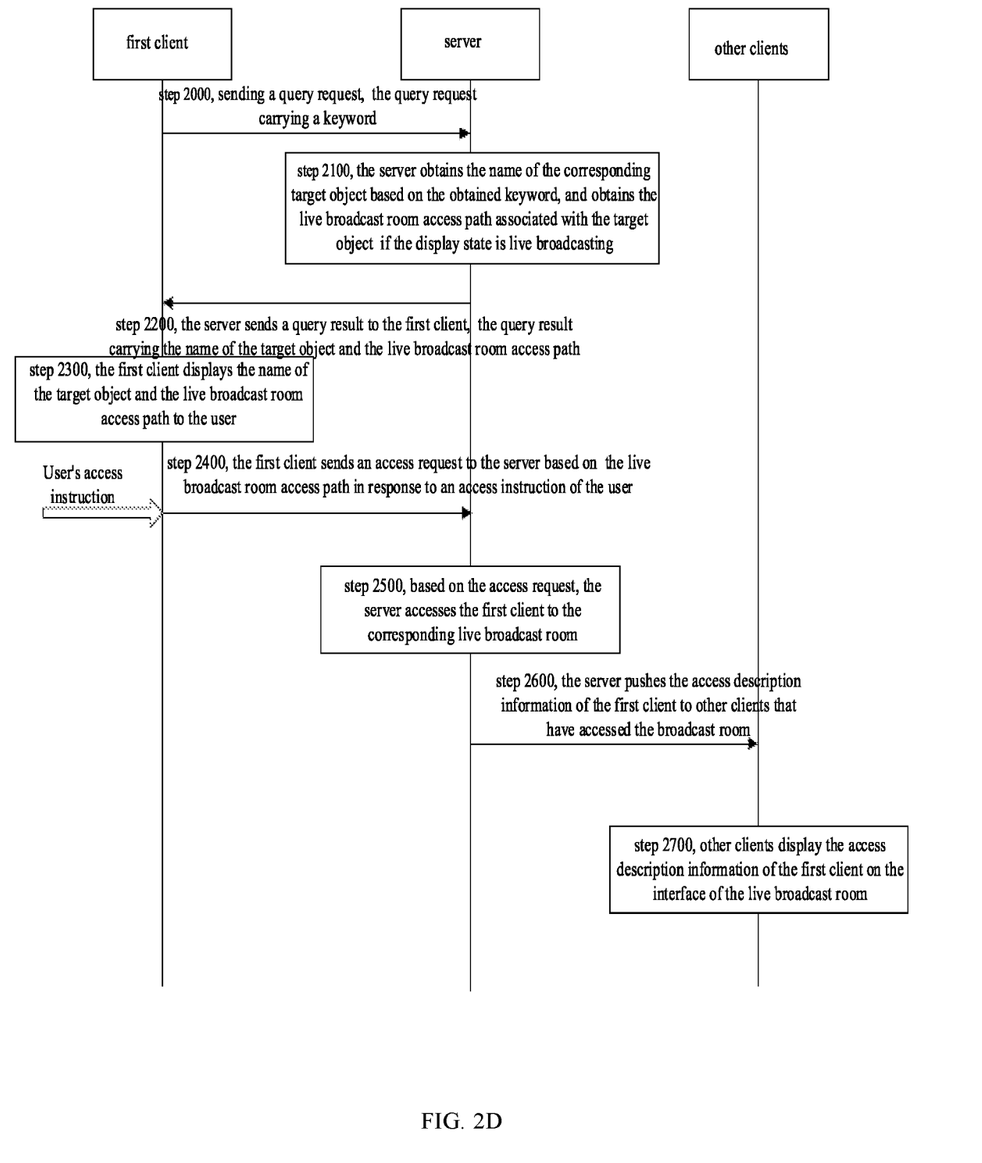
FIG. 2D is a schematic diagram of a detailed process of pushing information in a live broadcast room according to embodiments of the disclosure.

Based on the above system architecture, as illustrated in FIG. 2D, in embodiments of the disclosure, the specific process of pushing information in the live broadcast room is as follows.

At step 2000, the first client sends a query request to the server, the query request carrying the keyword.

In detail, the keyword sent by the first client may be denoted as query, which may be any keyword entered by the user according to his own preferences, such as hip-hop clothing, lady imitation makeup, and miscellaneous grains.

At step 2100, the server obtains the name of the corresponding target object based on the obtained keyword, and obtains the live broadcast room access path associated with the target object if the target object is in a live broadcasting state.

In detail, when implementing step 2100, the server may analyze the keyword to obtain the name of the target object corresponding to the keyword, and obtain the current display state of the target object through the real-time feature interface of target object provided in the background. When the display state is live broadcasting, the server obtains the live broadcast room access path of the target object is obtained.

For example, suppose that the keyword carried in the query request sent by the first client is "old+letters+clothes", then the server analyzes the keyword, and based on the association relationship between historical keywords searched by other clients and historical target objects in historical search data, finally determines the name of the target object corresponding to the keyword as "retro letter short sleeve+loose printed T-shirt".

Then, the server determines the current display state of the target object through the real-time feature interface of target object provided by a back-end e-commerce.

In practical applications, the target object may have three display states.

1. Page State

In the page state, the target object is displayed on a web page.

For example, the name of the target object is "retro letter short sleeve+loose printed T-shirt", and the target object is currently recorded on a web page X and displayed as the latest product.

2. Live Broadcast State

In the live broadcast state, the target object is displayed in the live broadcast room through a live video stream.

For example, the target object is "retro letter short sleeve+loose printed T-shirt", and the target object is currently in a live broadcast room X and is introduced as a new product by an anchor.

3. Playback State

In the playback state, the live broadcast process of the target object is completed, and the live broadcast room is closed, but the live video stream is recorded and saved in a designated storage area, and the target object may be played by replaying the live video stream.

In embodiments of the disclosure, no matter which display state the target object is in, the server returns the name of the target object and a display interface access path to the first client. The display interface access path, in the page state, is a page access path; in the live broadcast state, is the live broadcast room access path; and in the playback state, is a playback access path. In embodiments of the disclosure, since the related technology upgrade is performed for the live broadcast state, at step 2100, assuming that the target object is currently in the live broadcast state, then the server obtains the name of the target object and the live broadcast room access path associated with the target object. In the following embodiments, the live broadcast state is taken as an example, which will not be described in detail.

On the other hand, the name of the target object mentioned above refers to an actually used name displayed during the displaying process, rather than the keyword input by the first client.

At step 2200, the server sends a query result to the first client, the query result carrying the name of the target object and the live broadcast room access path.

In a specific implementation, the server may adopt a card display mode to return the query result to the first client, thereby displaying the name of the target object and the live broadcast room access path.

Figure 3:
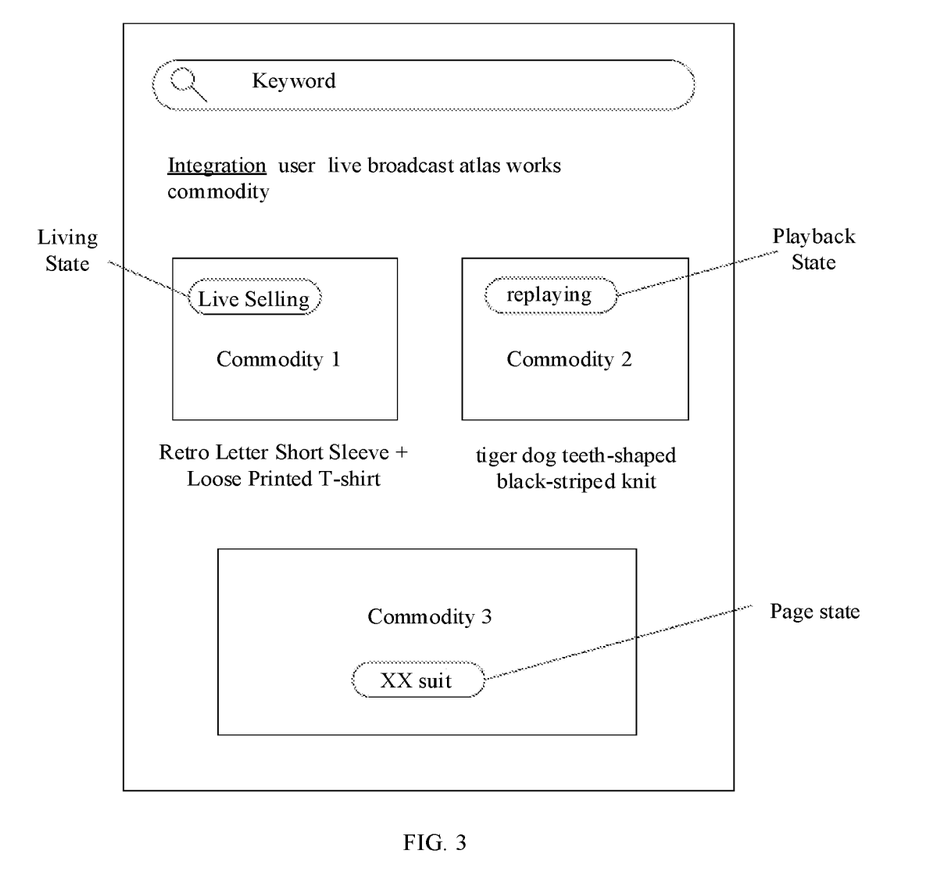
FIG. 3 is a schematic diagram of a display form of a target object according to embodiments of the disclosure.

For example, as illustrated in FIG. 3, assuming that the name of the target object obtained based on the input query is "Retro Letter Short Sleeve+Loose Printed T-shirt", then the final display card shows "Retro Letter Short Sleeve+Loose Printed T-shirt" and a "Live Selling" button indicating that the current display state of the above target object is "Living State", and the "Live Selling" button is associated with the live broadcast room access path (which is also called a live entrance). The user may access the live broadcast room by clicking the button of "Live Selling" on the operation interface of the first client.

For example, as illustrated in FIG. 3, suppose the name of another target object is "tiger dog teeth-shaped black-striped knit", then the final display card shows the name "tiger dog teeth-shaped black-striped knit", and a "replaying" button indicating that the current display state of the other target object mentioned above is "Playback State".

For another example, as illustrated in FIG. 3, assuming that the name of another target object is "XX suit", then in the final display card, the name "XX suit" is displayed, and "XX suit" itself is a webpage link button indicating that the current display state of the other target object is "page state".

At step 2300, the first client displays the name of the target object and the live broadcast room access path to the user.

The display mode has been introduced at step 2200, which is not repeated here.

At step 2400, the first client sends an access request to the server based on the live broadcast room access path in response to an access instruction of the user.

In detail, since the first client sends the access request to the server after the user clicks on the live broadcast room access path, the access request may carry at least identification information of the live broadcast room and the access description information of the first client, the access description information including the name of the target object.

At step 2500, based on the access request, the server accesses the first client to the corresponding live broadcast room.

In specific embodiments, the server may determine which live broadcast room the first client needs to access based on the identification information of the live broadcast room.

Further, the server may generate the information to be pushed according to the access description information of the first client.

At step 2600, the server pushes the access description information of the first client to other clients that have accessed the live broadcast room.

In specific implementation, the first client informs an aggregation interface of the server of the access description information of the first client through the access request, in which the access description information includes at least the name of the target object.

For example, assuming that the target object is an e-commerce product for sale, a content notified by the access request is that the user clicks on product information (product ID, product name) & user information (user ID, user name).

In this way, the server may know which target object the user clicked on through the first client to enter the live broadcast room.

In an embodiment, the server needs to control a frequency of pushing information, and pushes the access description information of the first client to other clients that have accessed the live broadcast room when the time period between the current time and the time corresponding to the last pushing reaches a preset threshold. For example, the time period between two pushing may be set to be no less than 10 s.

At step 2700, other clients display the access description information of the first client on the interface of the live broadcast room.

In specific embodiments, there are two types of other clients: anchor clients and audience clients, which is introduced separately below.

1. Audience Client

The audience client pushes the access description information of the newly accessed first client in the form of barrage on the interface of the live broadcast room, the access description information including at least the name of the target object.

Figure 4:
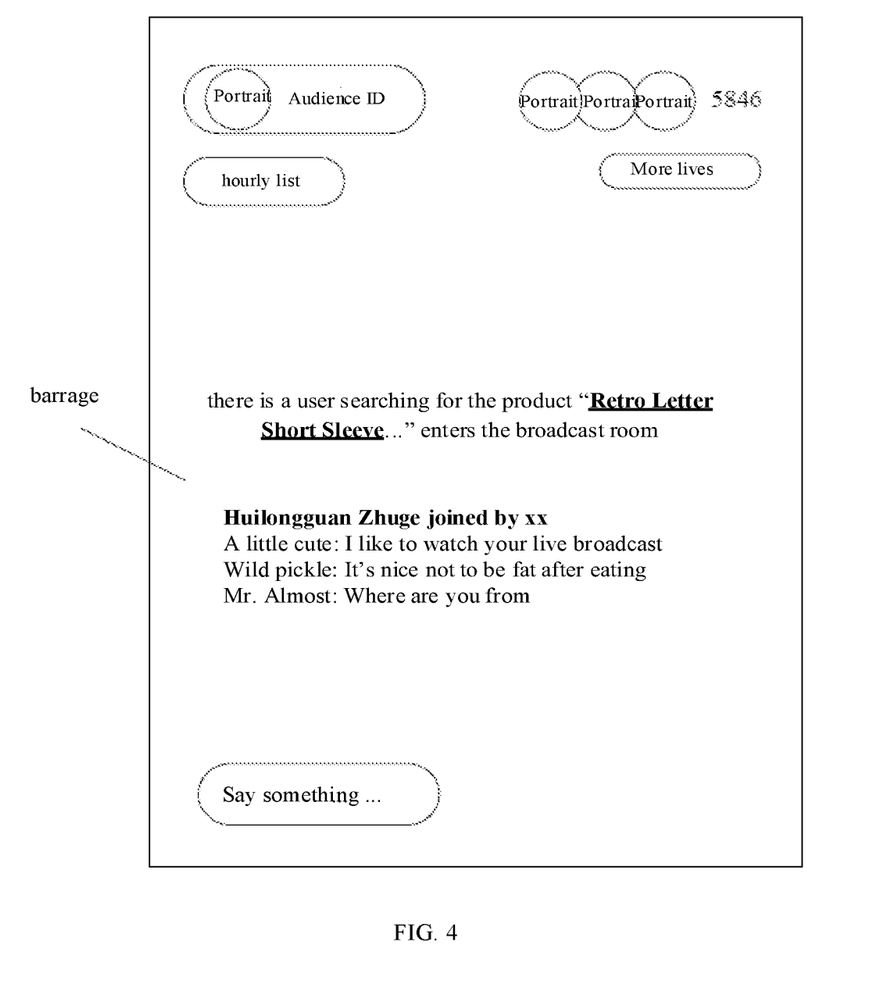
FIG. 4 is a schematic diagram of pushing information in a live broadcast room presented by an audience client according to embodiments of the disclosure.

For example, as illustrated in FIG. 4, after the first client accesses the live broadcast room, on the screen of the audience client, a special barrage pop up in the live broadcast room, displaying an entrance prompt "there is a user searching for the product "Retro Letter Short Sleeve+Loose Printed T-shirt" enters the live broadcast room". In an embodiment, the upper limit of the number of words displayed for the name of the target object may be set, for example, only 8 words are displayed at most. Therefore, the extra part excessing the upper limit of 8 are displayed as " . . . ".

In an embodiment, the audience client needs to control the frequency of pushing information, and pushes the access description information of the first client to the corresponding audience on the interface of the live broadcast room when the time period reaches the preset threshold. For example, the time period between two pushing may be set to be no less than 10 s.

2. Anchor Client.

Figure 5:
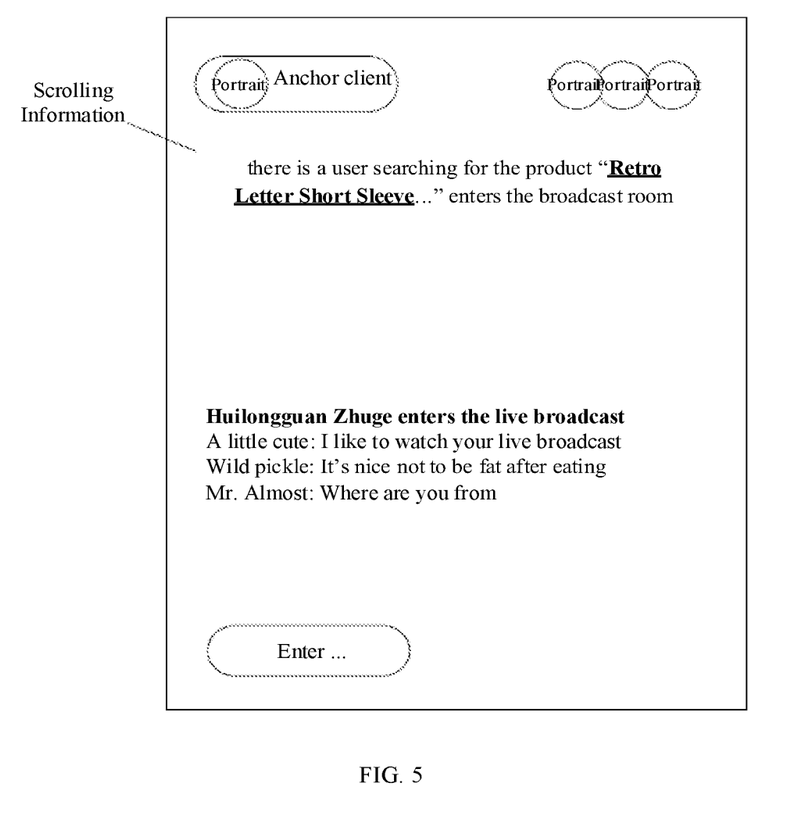
FIG. 5 is a schematic diagram of pushing information in a live broadcast room presented by an anchor client according to embodiments of the disclosure.

The anchor client pushes the access description information of the newly accessed first client by scrolling on the interface of the live broadcast room, in which the access description information includes at least the name of the target object.

For example, as illustrated in FIG. 5, after the first client accesses the live broadcast room, scrolling captain pops up above the live broadcast room on the screen of the anchor client, displaying an entrance prompt "there is a user searching for the product "Retro Letter Short Sleeve+Loose Printed T-shirt" enters the live broadcast room". In an embodiment, the upper limit of the number of words displayed for the name of the target object may be set, for example, 10 words are displayed at most. Therefore, the extra part excessing the upper limit of 10 are displayed as " . . . ".

In an embodiment, the anchor client needs to control the frequency of pushing information, and pushes the access description information of the first client to the anchor in the interface of the live broadcast room when the time period between the current time and the time corresponding to the last pushing reaches the preset threshold. For example, the time period between two pushing may be set to be no less than 10 s.

In embodiments of the disclosure, in the pushed information displayed in the form of barrage or scrolling captain, the name of the target object may be clicked. That is, the name of the target object may be set as the access path for the details page of the target object. In this way, when users (anchors or audience) corresponding to other clients click on the name of the target object on the screen, the server pushes the details page of the target object to other clients in response to the operation instructions generated by other clients based on the name of the target object, so that other clients access the detailed introduction page of the target object from the live broadcast room through the server, thereby presenting the details page to the users on the screen.

Figure 6:
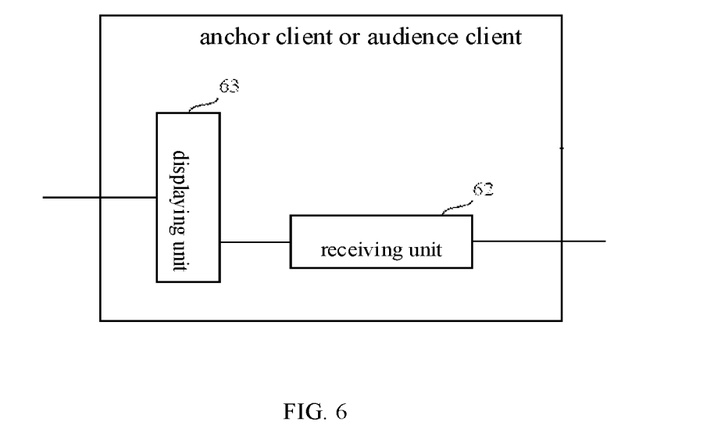
FIG. 6 is a schematic diagram of logic architecture of an anchor client or an audience client according to embodiments of the disclosure.

Based on the same inventive concept, as illustrated in FIG. 6, embodiments of the disclosure provide an apparatus for pushing information in a live broadcast room (for example, an audience client or an anchor client), which at least includes a receiving unit 62, and a displaying unit 63.

The receiving unit 62 is configured to receive access description information of a first client pushed by a server, when the first client accesses the live broadcast room through an access path of a target object, in which the access description information includes a name of the target object obtained by the first client from the server based on a keyword.

The displaying unit 63 is configured to display the access description information on the interface of the live broadcast room.

In an embodiment, when displaying the access description information on the interface of the live broadcast room, the displaying unit 63 is configured to: display the access description information on the interface of the live broadcast room, when a time period between a current time and a time corresponding to a last pushing reaches a preset threshold.

In an embodiment, when displaying the access description information on the interface of the live broadcast room, the displaying unit 63 is configured to: display the access description information in a form of barrage or scrolling captain on the interface of the live broadcast room.

In an embodiment, after displaying the access description information, the accessing unit 61 is further configured to: access a details page of the target object from the live broadcast room in response to an operation instruction generated based on the name of the target object.

Figure 7:
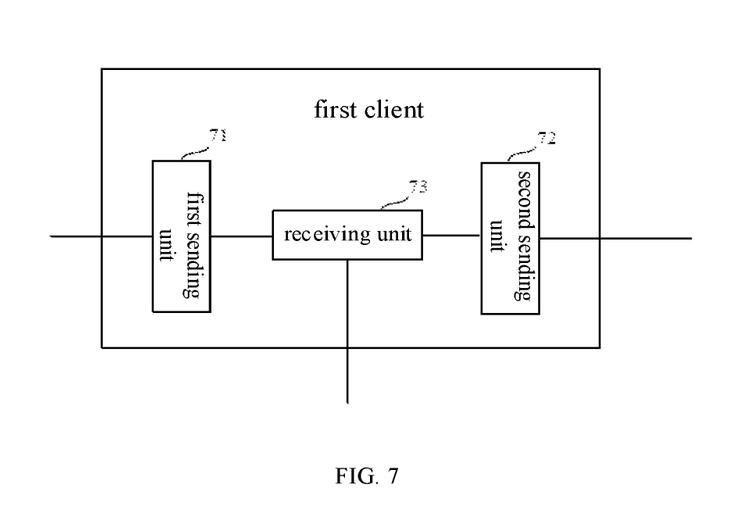
FIG. 7 is a schematic diagram of logic architecture of a first client according to embodiments of the disclosure.

Based on the same inventive concept, as illustrated in FIG. 7, embodiments of the disclosure provide an apparatus for pushing information in a live broadcast room (for example, a first client), which at least includes a first sending unit 71, a second sending unit 72 and a receiving unit 73.

The first sending unit 71 is configured to send a keyword to a server.

The receiving unit 73 is configured to receive a name of a target object and a live broadcast room access path associated with the target object from the server, in which the name of the target object is obtained by the server based on the keyword.

The second sending unit 72 is configured to send an access request to the server in response to an access instruction generated based on the live broadcast room access path, in which the access request is configured to access a corresponding live broadcast room through the server and to cause the server to push access description information of a first client to clients accessed to the live broadcast room other than the first client, in which the access description information includes the name of the target object.

Figure 8:
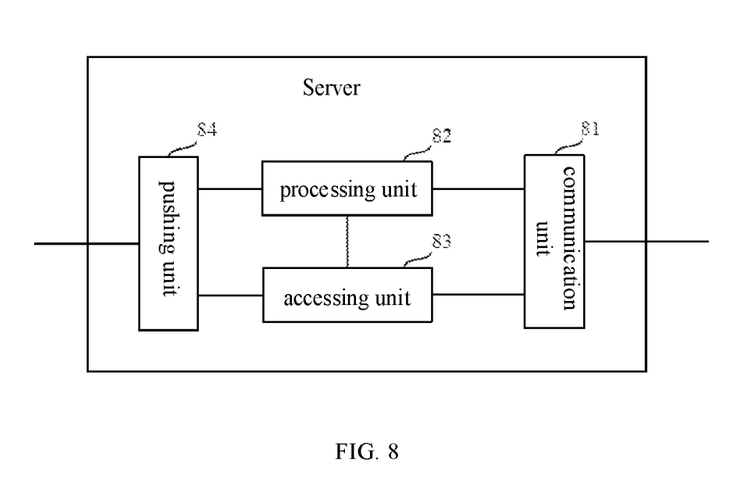
FIG. 8 is a schematic diagram of logic architecture of a server according to embodiments of the disclosure.

Based on the same inventive concept, as illustrated in FIG. 8, embodiments of the disclosure provide an apparatus for pushing information in a live broadcast room (for example, a server), which at least includes a communication unit 81, a processing unit 82, an accessing unit 83 and a pushing unit 84.

The communication unit 81 is configured to receive a keyword sent by a first client.

The processing unit 82 is configured to return a name of a target object obtained based on the keyword and a live broadcast room access path associated with the target object, to the first client.

The accessing unit 83 is configured to access the first client to a corresponding live broadcast room in response to an access instruction sent by the first client based on the live broadcast room access path.

The pushing unit 84 is configured to push access description information of the first client to clients accessed to the live broadcast room other than the first client, in which the access description information includes the name of the target object.

In an embodiment, after receiving the keyword sent by the first client, and before returning the name of the target object obtained based on the keyword and the live broadcast room access path associated with the target object, to the first client, the processing unit 82 is configured to: obtain the name of the target object corresponding to the keyword by analyzing the keyword; obtain a display state of the target object through a real-time feature interface of target object provided in a background; and obtain the live broadcast room access path associated with the target object if the display state is live broadcasting.

In an embodiment, when pushing the access description information of the first client to clients accessed to the live broadcast room other than the first client, the pushing unit 84 is configured to: push the access description information of the first client to clients accessed to the live broadcast room other than the first client, when a time period between a current time and a time corresponding to a last pushing reaches a preset threshold.

In an embodiment, after pushing the access description information of the first client to clients accessed to the live broadcast room other than the first client, the pushing unit 84 is further configured to: push a details page of the target object to the clients other than the first client, in response to an operation instruction generated by the clients other than the first client based on the name of the target object.

Figure 9:
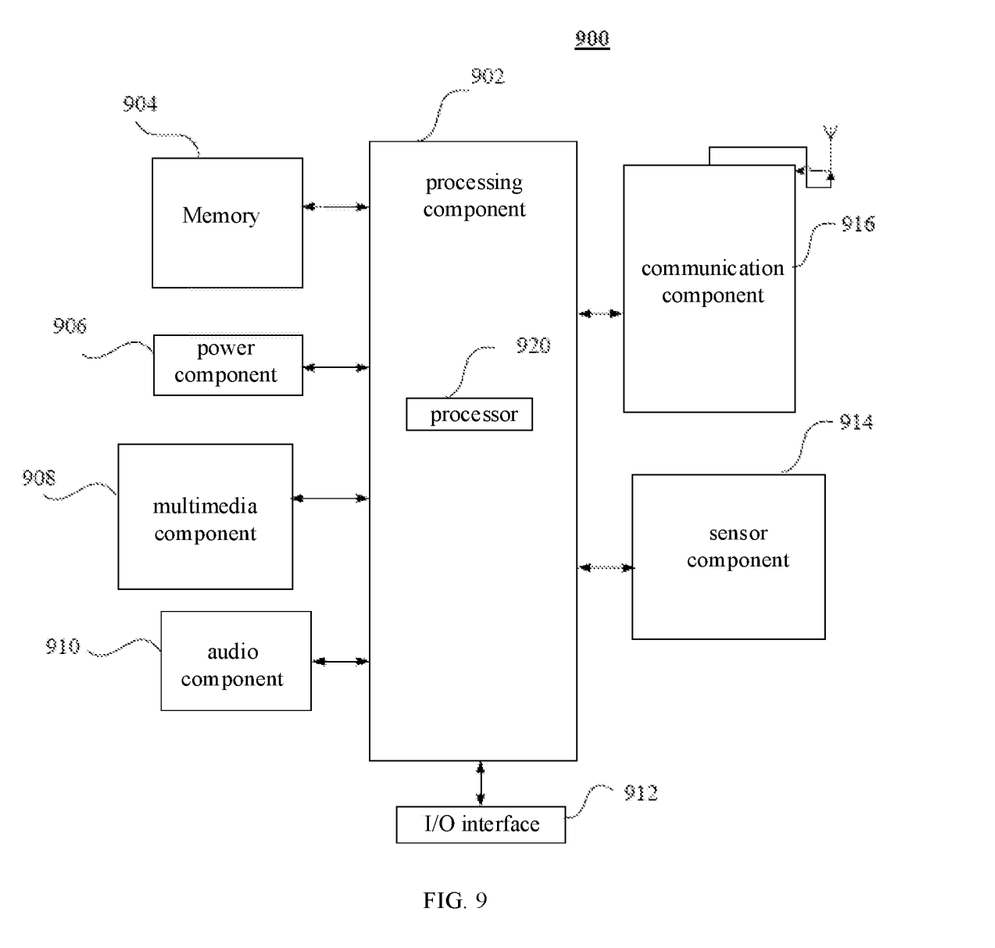
FIG. 9 is a schematic diagram of physical architecture of a computer device according to embodiments of the disclosure.

Based on the same inventive concept, as illustrated in FIG. 9, embodiments of the disclosure provide a computer device. For example, the electronic device 900 may be a mobile phone, a computer, a digital broadcasting terminal, a message transceiver device, a game console, a tablet device, a medical device, a fitness device and a personal digital assistant.

As illustrated in FIG. 9, the electronic device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the electronic device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the electronic device 900. Examples of such data include instructions for any applications or methods operated on the electronic device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 906 provides power to various components of the electronic device 900. The power component 906 may include a power management system, one or more power sources, and any other components associated with the generation, management, and distribution of power in the electronic device 900.

The multimedia component 908 includes a screen providing an output interface between the electronic device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front-facing camera and/or a rear-facing camera. When the electronic device 900 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 910 is configured to output and/or input audio signals. For example, the audio component 910 includes a microphone (MIC) configured to receive an external audio signal when the electronic device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the electronic device 900. For instance, the sensor component 914 may detect an open/closed status of the electronic device 900, relative positioning of components, e.g., the display and the keypad, of the electronic device 900, a change in position of the electronic device 900 or a component of the electronic device 900, a presence or absence of user contact with the electronic device 900, an orientation or an acceleration/deceleration of the electronic device 900, and a change in temperature of the electronic device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the electronic device 900 and other devices. The electronic device 900 can access a wireless network based on a communication standard, such as WiFi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the electronic device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing any method according to the first or second aspect of the embodiments.

Figure 10:
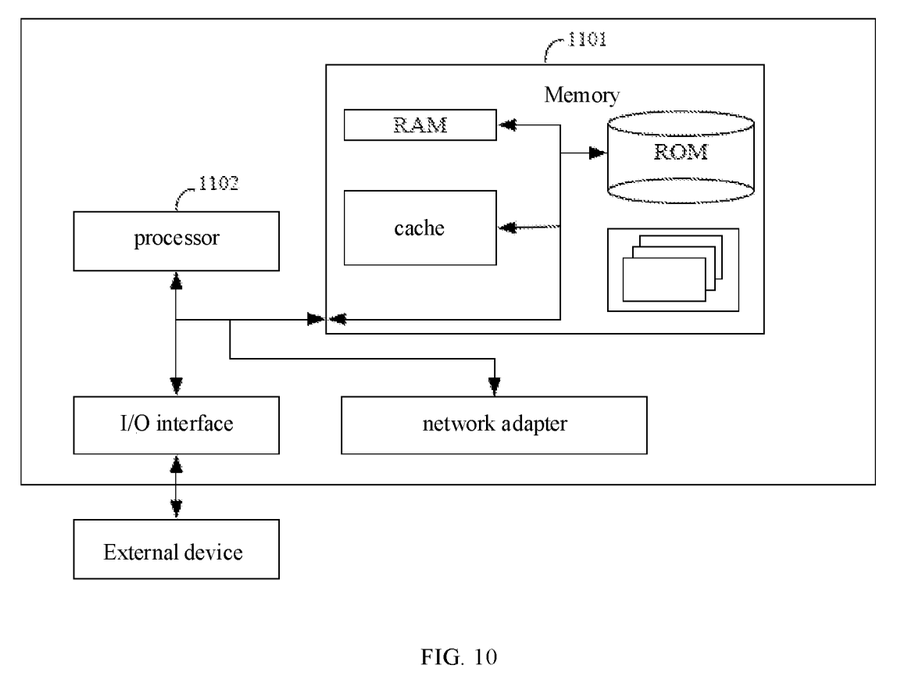
FIG. 10 is a schematic diagram of physical architecture of a network device according to embodiments of the disclosure.

Based on the same inventive concept, as illustrated in FIG. 10, embodiments of the disclosure provide a network device. The network device includes a memory 1101 configured to store executable instructions, and a processor 1102 configured to read and execute the executable instructions, and implement any method according to the third aspect of the embodiments. The processor 1102 generally controls overall operation of the network device, such as operations associated with display, telephone calls, data communications, camera operations, and recording operations. The memory 1101 is configured to store various types of data to support operations on the network device. Examples of such data include instructions for any application or method operating on the network device, such as, contact data, phonebook data, messages, pictures and video. The memory 1101 may be implemented using any type of volatile or non-volatile memory devices, or a combination thereof, such as a SRAM, an EEPROM, an EPROM, a PROM, a ROM, a magnetic memory, a flash memory, a magnetic or optical disk.

Based on the same inventive concept, embodiments of the disclosure provide a computer-readable storage medium. When instructions in the computer-readable storage medium are executed by a processor, any method in the above embodiments may be implemented.

Based on the same inventive concept, embodiments of the disclosure provide a computer program product includes executable instructions, and when the executable instructions of the computer program product are executed by a processor, any method in the above embodiments may be implemented.

In conclusion, in embodiments of the present disclosure, after the first client sends the keyword to the server, the server returns the name of the target object obtained based on the keyword and the live broadcast room access path, and in response to the access request of the first client, accesses the first client to the corresponding live broadcast room, and pushes the access description information of the first client to the other clients that have accessed the live broadcast room. After other clients access the live broadcast room, whenever a new client accesses the live broadcast room, the name of the target object associated with the new client is displayed on the interface of the live broadcast room. In this way, different clients perform interaction of reasons for accessing the live broadcast room with each other, so that the system may obtain sufficient prompt information, and may further effectively guide the behavior of each client, to improve accuracy and convenience of system service for each client, thereby greatly improving the service performance of the system.

In detail, in the live broadcast room, the technical solution may be used to enable the anchor client and the audience client in the live broadcast room to understand how the newly connected audience client comes to the live broadcast room through public domain traffic (search), so as to understand which products are hot products, and then to reversely stimulate each audience client to click on the hot products to increase a conversion rate, and to achieve effective diversion for e-commerce providers that provide various products.

Those skilled in the art should understand that the embodiments of the disclosure can be provided as a method, a system, or a computer program product. Therefore, the disclosure may adopt the form of a complete hardware embodiment, a complete software embodiment, or an embodiment combining software and hardware. Moreover, the disclosure may take the form of a computer program product implemented on one or more computer-usable storage media (including but not limited to disk storage, CD-ROM and optical storage) containing computer-usable program codes.

The disclosure is described with reference to flowcharts and/or block diagrams of methods, devices (systems), and computer program products according to embodiments of the disclosure. It should be understood that each process and/or block in the flowchart and/or block diagram, and the combination of processes and/or blocks in the flowchart and/or block diagram can be realized by computer program instructions. These computer program instructions can be provided to the processor of a general-purpose computer, a dedicated computer, an embedded processor, or other programmable data processing devices to generate a machine, so that the instructions executed by the processor of the computer or other programmable data processing devices are generated to realize the functions specified in one process or multiple processes in the flowchart and/or one block or multiple blocks in the block diagram.

These computer program instructions can also be stored in a computer-readable memory that can direct a computer or other programmable data processing devices to operate in a specific manner, so that the instructions stored in the computer-readable memory produce an article of manufacture including an instruction device. The instruction device implements the functions specified in one process or multiple processes in the flowchart and/or one block or multiple blocks in the block diagram.

These computer program instructions can also be loaded on a computer or other programmable data processing devices, so that a series of operations are executed on the computer or other programmable devices to produce computer-implemented process. Thereby, the instructions executed on the computer or other programmable devices provide steps for implementing the functions specified in one process or multiple processes in the flowchart and/or one block or multiple blocks in the block diagram.

Although the preferred embodiments of the disclosure have been described, those skilled in the art can make additional changes and modifications to these embodiments once a basic creative concept is learned. Therefore, the appended claims are intended to be interpreted as including the preferred embodiments and all changes and modifications falling within the scope of the disclosure.

Obviously, those skilled in the art can make various changes and modifications to the embodiments of the disclosure without departing from the spirit and scope of the embodiments of the disclosure. In this way, if these modifications and variations of the embodiments of the disclosure fall within the scope of the claims of the disclosure and the equivalent technologies, the disclosure is also intended to include these modifications and variations.

What is claimed is:

1. A method for pushing information in a live broadcast room, applied to an anchor client or an audience client having accessed the live broadcast room, the method comprising:
   receiving access description information of a first client pushed by a server, in response to the first client accessing the live broadcast room through an access path of a target object, wherein the access description information comprises a name of the target object, the name of the target object is obtained by the first client from the server based on a keyword; and
   displaying the access description information on an interface of the live broadcast room.

2. The method of claim 1, wherein displaying the access description information on the interface of the live broadcast room, comprises:
   displaying the access description information on the interface of the live broadcast room, in response to a time period between a current time and a time corresponding to a last pushing reaching a preset threshold.

3. The method of claim 2, wherein displaying the access description information on the interface of the live broadcast room, comprises:
   displaying the access description information in a form of barrage or scrolling captain on the interface of the live broadcast room.

4. The method of claim 1, further comprising:
   accessing a details page of the target object from the live broadcast room in response to an operation instruction generated based on the name of the target object.

5. The method of claim 1, wherein a number of words contained in the barrage or the scrolling captain is limited based on the name of the target object.

6. A method for pushing information in a live broadcast room, applied to a server, comprising:
   receiving a keyword sent by a first client;
   returning a name of a target object obtained based on the keyword and a live broadcast room access path associated with the target object, to the first client;
   connecting the first client to a live broadcast room in response to an access request sent by the first client based on the live broadcast room access path; and
   pushing access description information of the first client to clients accessed to the live broadcast room other than the first client, wherein the access description information comprises the name of the target object.

7. The method of claim 6, further comprising:
   obtaining the name of the target object corresponding to the keyword by analyzing the keyword;
   obtaining a display state of the target object through a real-time feature interface of target object provided in a background; and
   obtaining the live broadcast room access path associated with the target object in response to the display state being live broadcasting.

8. The method according to claim 6, wherein pushing the access description information of the first client to clients accessed to the live broadcast room other than the first client, comprises:
   pushing the access description information of the first client to clients accessed to the live broadcast room other than the first client, in response to a time period between a current time and a time corresponding to a last pushing reaching a preset threshold.

9. The method of claim 8, further comprising:
   pushing a details page of the target object to the clients other than the first client, in response to an operation instruction generated by the clients other than the first client based on the name of the target object.

10. The method of claim 6, wherein the keyword is carried in a query request, and the query request is sent by the first client to the server.

11. The method of claim 6, wherein the access request comprises at least identification information of the live broadcast room and the access description information of the first client.

12. The method of claim 11, further comprising:
   determining the live broadcast room to which the first client accesses according to the access request.

13. The method of claim 11, further comprising:
   obtaining the access description information of the first client from the access request.

14. The method of claim 7, wherein obtaining the name of the target object corresponding to the keyword by analyzing the keyword comprises:
   obtaining the name of the target object corresponding to the keyword by analyzing the keyword and by querying an association relationship between keywords and target objects in historical search data.

15. The method of claim 7, wherein the display state of the target object comprises a page state, live broadcasting, or playback.

16. An apparatus for pushing information in a live broadcast room, applied to an anchor client or an audience client having accessed the live broadcast room, the apparatus comprising:
   a processor; and
   a memory, configured to store instructions stored in the memory,
   wherein the processor is configured to read and execute the instructions stored in the memory, so as to:
   receive access description information of a first client pushed by a server, in response to the first client accessing the live broadcast room through an access path of a target object, wherein the access description information comprises a name of the target object, the name of the target object is obtained by the first client from the server based on a keyword; and display the access description information on a interface of the live broadcast room.

17. The apparatus of claim 16, wherein the processor is configured to:

display the access description information on the interface of the live broadcast room, in response to a time period between a current time and a time corresponding to a last pushing reaching a preset threshold.

18. The apparatus of claim 16, wherein the processor is configured to:

display the access description information in a form of barrage or scrolling caption on the live broadcast room.

19. The apparatus of claim 16, wherein the processor is further configured to:

access a details page of the target object from the live broadcast room in response to an operation instruction generated based on the name of the target object.

20. The apparatus of claim 18, wherein a number of words contained in the barrage or the scrolling captain is limited based on the name of the target object.

\* \* \* \* \*